F. L. SIMMONS.
METHOD AND APPARATUS FOR ALINING WORK ON V-BLOCKS AND THE LIKE FOR MAGNETIC CHUCKS.
APPLICATION FILED JULY 8, 1919.
1,336,928. Patented Apr. 13, 1920.
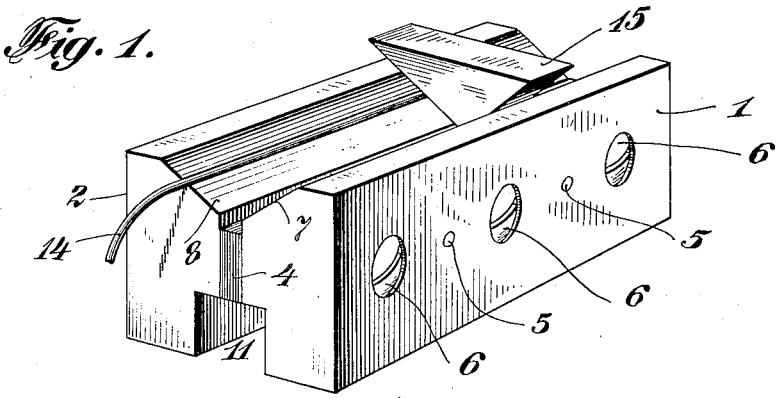
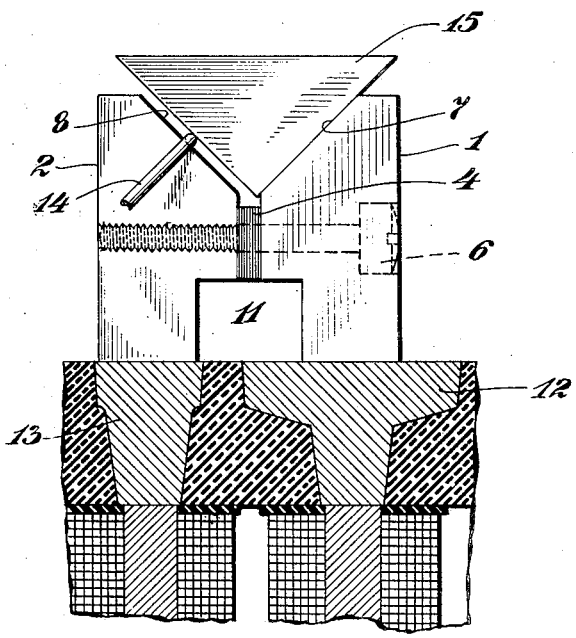
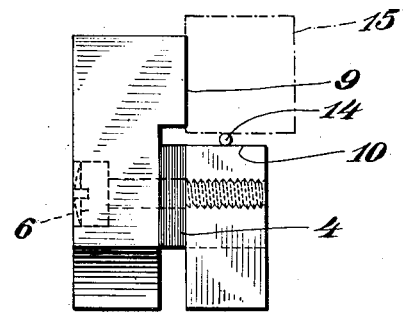
Inventor
Frank L. Simmons
By George Ramsey
Attorney

UNITED STATES PATENT OFFICE.

FRANK L. SIMMONS, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

METHOD AND APPARATUS FOR ALINING WORK ON V-BLOCKS AND THE LIKE FOR MAGNETIC CHUCKS.

1,336,928.  Specification of Letters Patent.  Patented Apr. 13, 1920.

Original application filed May 10, 1919, Serial No. 296,162. Divided and this application filed July 8, 1919. Serial No. 309,350.

*To all whom it may concern:*

Be it known that I, FRANK L. SIMMONS, a citizen of the United States, residing at Woonsocket, in the county of Providence, State of Rhode Island, have invented certain new and useful Improvements in Methods and Apparatus for Alining Work on V-Blocks and the like for Magnetic Chucks, of which the following is a specification.

This invention relates to a method and an apparatus for alining work upon a magnetizable work support for use with magnetic chucks.

The invention contemplates a method and apparatus for alining work upon magnetizable V-blocks or parallel bars in such manner that work will be alined definitely with a predetermined work surface on the said bar or V-block.

Another and principal object of the present invention is the method of alining work upon a parallel or V-block having angularly disposed surfaces adapted to be magnetized, which method comprises providing a fitted surface on the work, which surface is adapted to coöperate with one of the work faces on the parallel or V-block, then providing a pivot or small spacing member between one face on the V-block or parallel in such a manner that the work may turn on the pivot and thereby be brought into intimate contact with the other work face.

More specifically the invention contemplates providing a magnetizable support having a plurality of work faces angularly disposed, and a small wire between one work face and the work whereby the wire is clamped between the work face and the work to permit the work to intimately contact with the other work face.

Other and further objects of the present invention will in part be obvious and will in part be pointed out hereinafter and in the accompanying drawings wherein like parts are represented by like characters throughout the several figures thereof.

Realizing that the present invention may be embodied in constructions other than those specifically disclosed, and practised by methods which do not materially differ from that disclosed, I desire this disclosure to be understood as illustrative and not to be taken in the limiting sense.

Figure 1 is a perspective view illustrating one form of V-block with a work piece supported thereon in accordance with the method hereinafter specified.

Fig. 2 is and end view of the device shown in Fig. 1 and illustrates the manner in which work may be supported thereon.

Fig. 3 is a view of a different type of device comprising a parallel bar illustrating a work piece mounted thereon in accordance with the present invention.

In the use of precision tools, such as V-blocks or parallel bars having angularly disposed precision work faces, it is desirable that the work be definitely alined against one work face and supported by the other work face. This is particularly desirable in magnetizable holding devices. Where the work has not been previously surfaced on both holding faces, there is a liability of the work being wedged between the two work face surfaces on the precision tool and not being definitely alined with either, or where the work comprises small pieces certain of these pieces may be alined with one surface and not with the other surface. These difficulties introduce elements of uncertainty in finishing work to definite exact angles.

My invention comprises overcoming these difficulties by providing a pivotal work support on one surface which slightly separates all the work pieces from this surface and permits all work pieces to be tightly held against the opposite work face.

This pivot support may comprise a small wire which extends under the work pieces and separates the work pieces only a slight distance from one work face so that while the work pieces may pivot on the wire, the work and the face supporting the wire are not separated sufficiently to seriously break magnetic circuits so that the work is securely held clamped against the wire and against the opposite precision surface.

In carrying out the method, it is preferable that one face of the work shall be finished to fit one precision work face on the support, before the work is placed on the support. This insures a definite fit which otherwise might not be obtained.

Referring now to the drawings, the type of V-block which I have selected for illustrating the present invention comprises a pair of magnetic side members 1 and 2 which are separated by a strip of non-magnetizable material 4. These side members 1 and 2 may be positioned by means of dowel pins 5 and may be secured together by means of machine screws 6. The dowel pins and the machine screws preferably are non-magnetizable material in order not to short-circuit the lines of force through the members 1 and 2.

The work faces 7 and 8 on the members 1 and 2 may be angularly disposed as shown in Figs. 1 and 2 with the angle on both faces substantially the same, or they may be provided with faces 9 and 10 as shown in Fig. 3, one of which faces is horizontal and the other vertical; or the angularity may be disposed as is otherwise desired. The members 1 and 2 may be arched as at 11 to comprise base members which are adapted to set on poles 12 and 13 of a suitable magnetic chuck.

A pivot is provided adjacent one work face, and while this pivot may be of various forms, preferably it is composed of a small wire 14 which is placed between one work face, for example, the work face 8 in Fig. 1, or the work face 10 in Fig. 3, and the work pieces 15. This pivot may be stationary or it may be movable. Preferably it is movable in order that it may be placed at the most convenient point to properly sustain the type of work being operated upon. In practice this wire preferably is quite small, though in the drawings I have illustrated the wire of considerable size in order to clearly illustrate the invention.

The present invention comprises a division of my prior application, Serial Number 296,162, filed May 10, 1919, in which prior application the particular V-block and parallel bar construction herein shown is claimed.

What I claim is:

1. The method of alining work on a magnetizable work support having a plurality of pole piece faces angularly disposed; which method comprises finishing one side of the work to fit one face; providing a pivot on another of said faces; then placing the work upon the said pivot with the finished side against the face to which it has been fitted and in such manner that when the support is magnetized the work may oscillate on said pivot to firmly set the finished side against the said face to which the work has been fitted.

2. The method of alining work on a magnetizable work support having a plurality of pole pieces with angularly disposed work faces; which method comprises providing a pivot wire extending along one work face in such manner as to separate the work a slight distance from the said work face; then setting the work on the support in such manner as to rest full against another of said work faces and to be capable of pivoting on the pivot wire so that when the support is magnetized the work is tightly held against the wire and full against the operative work face to permit a side of the work to be finished accurately relatively to the operative work face.

3. The method of alining work upon magnetizable work supports provided with a plurality of angularly disposed work faces which method comprises shaping the work to correspond to one of said work faces; then providing a longitudinally extending movable pivot on the other of said work faces; then placing the work with the fitted side against the supporting work face to which the fitted side corresponds and with the work resting upon the said pivot whereby the work is slightly separated from the pivotal work face; and then energizing the support to constitute one work face one pole piece and the other work face as a different pole piece whereby the work is securely supported in full contact with one work face.

4. The method of alining work on a magnetizable work support comprising two pole piece members provided with angularly disposed work faces; said method comprising finishing the work in such manner as to accurately engage one work face; then providing a small wire to form a suitable pivot adjacent the other work face; then placing the work on the pivot wire and in contact with the other work face; and then energizing the support.

5. An apparatus for alining work on a magnetizable work support said apparatus comprising a plurality of pole pieces having work faces angularly disposed, non-magnetic material between the pole pieces, a pivot on one of said pole pieces and arranged in such manner that when the support is magnetized the work may oscillate on said pivot to firmly set the work against one of the said work faces.

6. An apparatus for alining work on a magnetizable work support, said apparatus comprising in combination a plurality of pole piece members with angularly disposed work faces, one of which work faces is adapted to comprise an operative work face against which work is to be alined, a pivot wire extending along one work face in such manner as to separate the work a slight distance from the other work face and whereby work may be capable of pivoting on the pivot wire so that when the support is magnetized the work is tightly held against the wire and full against the operative work face to permit a side of the work to be finished accurately relatively to the operative work face.

7. An apparatus for alining work on a magnetizable work support and comprising in combination two pole piece members provided with angularly disposed work faces, non-magnetic material separating the said members, and a small wire forming a pivot adjacent the other work face, said wire comprising one work support and a work face comprising the other work support.

FRANK L. SIMMONS.